(12) United States Patent
Hallundbæk

(10) Patent No.: US 11,524,612 B2
(45) Date of Patent: Dec. 13, 2022

(54) ELECTRIC BUS SEAT AND ELECTRIC BATTERY ARRANGEMENT

(71) Applicant: Alpha EC Industries 2018 S.à.r.l., Luxembourg (LU)

(72) Inventor: Jørgen Hallundbæk, Luxembourg (LU)

(73) Assignee: ALPHA EC INDUSTRIES, Grand-Rue (LU)

(*) Notice: Subject to any disclaimer, the term of this patent is extended or adjusted under 35 U.S.C. 154(b) by 46 days.

(21) Appl. No.: 16/593,485

(22) Filed: Oct. 4, 2019

(65) Prior Publication Data

US 2020/0108740 A1   Apr. 9, 2020

(30) Foreign Application Priority Data

Oct. 5, 2018   (LU) .................................... 100955

(51) Int. Cl.
| | |
|---|---|
| *B60K 1/04* | (2019.01) |
| *B60N 2/24* | (2006.01) |
| *B60G 17/00* | (2006.01) |
| *B60K 7/00* | (2006.01) |
| *B60L 50/60* | (2019.01) |
| *B62D 31/02* | (2006.01) |

(52) U.S. Cl.
CPC ............ *B60N 2/242* (2013.01); *B60G 17/00* (2013.01); *B60K 1/04* (2013.01); *B60K 7/0007* (2013.01); *B60L 50/66* (2019.02); *B60G 2500/30* (2013.01); *B60K 2001/0433* (2013.01); *B60K 2001/0438* (2013.01); *B60L 2200/18* (2013.01); *B60L 2220/46* (2013.01); *B60Y 2200/143* (2013.01); *B60Y 2200/91* (2013.01); *B62D 31/025* (2013.01)

(58) Field of Classification Search
CPC .............. B60K 1/04; B60K 2001/0438; B60K 2001/0433; B60K 7/0007; B60N 2/242; B60L 50/66
See application file for complete search history.

(56) References Cited

U.S. PATENT DOCUMENTS

| | | | | |
|---|---|---|---|---|
| 384,911 A | * | 6/1888 | Hunter .................... | B60L 53/80 105/51 |
| 3,347,333 A | * | 10/1967 | Edwards ................ | B60K 17/22 180/65.6 |

(Continued)

FOREIGN PATENT DOCUMENTS

| | | |
|---|---|---|
| CN | 101961984 A | 2/2011 |
| CN | 102358354 A | 2/2012 |

(Continued)

OTHER PUBLICATIONS

Luxembourg Search Report with Written Opinion dated Jun. 27, 2019, 9 pages.

*Primary Examiner* — Frank B Vanaman
(74) *Attorney, Agent, or Firm* — Rankin, Hill & Clark LLP

(57) ABSTRACT

An electric bus exhibiting a seat arrangement. The electric bus includes a side wall, a wheel with an electric engine disposed in the rim, a seat with a seat base and a leg area. The leg area is below the seat base and vertically level with the wheel. The electric bus also includes an electric energy storing device powering the electric engine of the wheel and arranged transversally between the side wall and the leg area of the seat.

16 Claims, 5 Drawing Sheets

(56) References Cited

U.S. PATENT DOCUMENTS

| | | | | |
|---|---|---|---|---|
| 3,566,165 | A * | 2/1971 | Lohr | B60L 7/22 |
| | | | | 310/67 R |
| 4,600,241 | A * | 7/1986 | Fujii | A47C 9/06 |
| | | | | 297/452.19 |
| 4,930,590 | A * | 6/1990 | Love | B60K 7/0007 |
| | | | | 180/308 |
| 5,056,848 | A * | 10/1991 | Fekete | B62D 31/02 |
| | | | | 296/63 |
| 5,193,849 | A | 3/1993 | Holzmann | |
| 5,655,816 | A * | 8/1997 | Magnuson | B60N 2/0292 |
| | | | | 297/232 |
| 5,704,644 | A * | 1/1998 | Jaggi | B60K 1/04 |
| | | | | 280/796 |
| 6,098,995 | A | 8/2000 | Danis | |
| 6,364,352 | B1 * | 4/2002 | Norton | G01G 19/4142 |
| | | | | 280/735 |
| 8,720,617 | B2 | 5/2014 | Peng et al. | |
| 9,561,828 | B2 | 2/2017 | Niu et al. | |
| 2002/0167207 | A1 * | 11/2002 | Larson | B60N 2/4221 |
| | | | | 297/216.1 |
| 2003/0102029 | A1 * | 6/2003 | Crook | H01M 50/60 |
| | | | | 137/260 |
| 2003/0141752 | A1 * | 7/2003 | Igarashi | B60N 2/242 |
| | | | | 297/452.18 |
| 2008/0251246 | A1 * | 10/2008 | Ohkuma | B60L 58/26 |
| | | | | 165/287 |
| 2009/0320715 | A1 * | 12/2009 | Morita | H01M 10/635 |
| | | | | 105/51 |
| 2010/0019551 | A1 * | 1/2010 | Oviedo | B60N 2/686 |
| | | | | 297/183.6 |
| 2010/0314182 | A1 * | 12/2010 | Crain | B60L 50/66 |
| | | | | 180/60 |
| 2013/0000997 | A1 | 1/2013 | Peng et al. | |
| 2013/0180790 | A1 * | 7/2013 | Bisror | B60L 50/66 |
| | | | | 180/68.5 |
| 2014/0124278 | A1 * | 5/2014 | Takamura | H05K 7/20918 |
| | | | | 180/65.51 |
| 2016/0090134 | A1 | 3/2016 | Niu et al. | |

FOREIGN PATENT DOCUMENTS

| | | |
|---|---|---|
| CN | 203832595 U | 9/2014 |
| CN | 107521325 A | 12/2017 |
| WO | 2013/000385 A1 | 1/2013 |
| WO | 2016/050125 A1 | 4/2016 |

* cited by examiner

ELECTRIC BUS SEAT AND ELECTRIC BATTERY ARRANGEMENT

TECHNICAL FIELD

The invention lies in the field of electric buses. More precisely, the invention concerns a seat arrangement within the passenger compartment of an autonomous electric bus. The invention considers the passenger safety of an electric bus.

BACKGROUND OF THE INVENTION

An electric bus provides a solution to pollution in cities. It permits to transport passengers without fine particles emissions or carbon dioxide emissions. Its silent engines increase the passengers' comfort and do not produce noise in the environment.

Such an electric bus generally exhibits a seating capacity of about fifty places, and about fifty standing places. More than one hundred places have to be foreseen in the passenger compartment while taking due care of the electric batteries that power the driving wheels. The positioning of the electric battery must also respect compacity requirements in order to maintain a reduced radius of turning curvature. The centre of gravity is also a design constraint.

In order to improve the passenger compartment accessibility, the electric bus exhibits a low platform which remains at the bus dock platform level during passenger boarding. This aspect notably eases the rolling chair entrance. However, during driving conditions the electric bus may be collided by another vehicle. More precisely, a long articulated electric bus may experience a side collision wherein the other vehicle strikes its side wall. Here, the front bumper of the other vehicle intrudes in the passenger compartment, which represents a danger for standing passengers and for sitting passengers.

The document CN 203 832 585 U discloses a bus with seat rows and electric batteries.

The document U.S. Pat. No. 9,561,828 B2 discloses an articulated bus exhibiting longitudinal seat rows and several battery packs.

Technical Problem to be Solved

It is an objective of the invention to present an electric bus which overcomes at least some of the disadvantages of the prior art. In particular, it is an objective of the invention to improve the passenger safety in an electric bus. More precisely, the invention intends to increase the passenger protection against side collision from other vehicles.

SUMMARY OF THE INVENTION

The invention has for object an electric bus including: a side wall, a wheel, an electric engine coupled to the wheel in order to drive the electric bus, a seat with a seat base and a leg area which is below the seat base and vertically level with the wheel; and electric energy storing means powering the electric engine and arranged between, notably transversally, the side wall and the leg area of the seat.

Preferably, the electric bus includes a low platform with a top surface, a passenger compartment with a longitudinal passageway; and the wheel includes a rotation axis.

Preferably, the wheel is vertically mobile between at least a driving position in which the rotation axis of the wheel is below the top surface, and a boarding position in which the rotation axis of the wheel is above the top surface of the low platform.

Preferably, the low platform includes a low platform structure bellow the electric energy storing means.

Preferably, the low platform includes a top surface projecting longitudinally along the whole length of the side wall, or the majority of the length of the side wall.

Preferably, the top surface is a planar top surface.

Preferably, the electric bus exhibits a rectangular floor, the electric energy storing means are disposed at a corner of the rectangular floor, preferably the electric bus includes electric energy storing means at each corner of the rectangular floor.

Preferably, the wheel includes a hub and a rim, the top surface being vertically level with the hub and/or with the rim, and the electric engine is disposed in the wheel notably in the rim.

Preferably, the electric bus includes a suspension system to which the wheel is mounted, said suspension system being vertically level the electric energy storing means.

Preferably, the rotation axis is vertically level with the electric energy storing means, notably in a boarding configuration, and/or vertically distant from the electric energy storing means during a driving configuration.

Preferably, the seat base is over the electric energy storing means.

Preferably, the seat includes a backrest parallel to the side wall.

Preferably, the seat is a first seat, the electric bus includes a longitudinal row of seats to which the first seat belongs.

Preferably, the electric bus includes a recess in which the electric energy storing means are disposed, and the side wall preferably includes a flap delimiting the recess.

Preferably, the electric bus includes an inclined bar delimiting the recess, the inclined bar projecting preferably vertically and transversally.

Preferably, the inclined bar is disposed below the seat, or the longitudinal row of seats respectively.

Preferably, the electric bus includes a wheel housing in which the wheel is disposed, said wheel housing delimiting longitudinally the recess.

Preferably, the seat base projects transversally over a majority of the width of the electric energy storing means.

Preferably, the electric bus includes a longitudinal upper beam to which the electric energy storing means and the seat are fixed.

Preferably, the longitudinal upper beam vertically separates the seat from the electric energy storing means.

Preferably, the low platform includes at least one lower longitudinal beam below the electric energy storing means, notably an inner lower longitudinal beam and/or an outer lower longitudinal beam which partially forms the side wall.

Preferably, the electric energy storing means include at least forty modules, the modules forming vertical or longitudinal rows.

Preferably, the electric energy storing means are a first electric energy storing means adjacent to the side wall, and the electric bus includes second electric energy storing means adjacent the side wall; the wheel being disposed between the first electric energy storing means and the second electric energy storing means.

Preferably, the seat base touches and/or overlaps transversally the leg area.

Preferably, the electric energy storing means are disposed transversally between the side wall and the passenger compartment, and/or the longitudinal passageway.

Preferably, the electric energy storing means are vertically thicker than the low platform.

Preferably, the electric bus includes a body or a unit, the low platform extending along the whole length of the body or unit.

Preferably, the flat surface and/or the top surface is adjacent and/or longitudinally level with the seat.

Preferably, the flat surface and/or the top surface projects transversally along the majority of the width of the electric bus.

Preferably, the whole electric energy storing means of the electric bus have a capacity of at least 500 kW·h.

Preferably, the electric bus includes a roof free of electric battery and/or of power accumulator.

Preferably, the wheel includes a rim and a hub, the rim and/or the hub being vertically level with the electric energy storing means.

Preferably, the backrest is fixed to the side wall.

Preferably, the low platform is a passenger low platform.

Preferably, the recess is adjacent to the wheel housing.

Preferably, the low platform includes a central beam including a smaller cross section than the lower longitudinal beam.

Preferably, the electric energy storing means separate transversally the leg area from the side wall.

Preferably, the electric bus includes a vertical plate separating transversally the leg area from the electric energy storing means and/or from the side wall.

Preferably, the vertical plate delimits the recess.

Preferably, the electric bus includes a lower half and an upper half, at least one, or a majority, or all the electric energy storing means being enclosed in said lower half.

Preferably, the electric energy storing means project transversally over a majority of the seat base.

Preferably, the seat, notably the longitudinal row of seats, is longitudinally level with the low platform, preferably level with the top surface.

Preferably, the seat(s) is/are (a) transversal seat(s).

Preferably, the ground clearance of the electric bus ranges from the half of the radius of the wheel to the radius of the wheel.

Preferably, the horizontal beam is vertically level with the leg area.

Preferably, the horizontal beam forms a separation vertically between the electric energy storing means and the seat, optionally and the seat base.

Preferably, the horizontal beam forms a vertical link joining the electric energy storing means and the seat, optionally and the seat base.

Preferably, the electric energy storing device is an electric power supply.

The leg area is not an essential aspect of the invention. The low platform is not an essential aspect of the invention. The electric engine is not necessarily in the wheel. The fixation interface is not an essential aspect of the invention.

It is another aspect of the invention to provide an electric bus including:
- a side wall,
- a wheel
- an electric engine coupled to the wheel in order to drive the electric bus,
- a seat with a seat base and a leg area which is below the seat base and vertically level with the wheel; and
- electric energy storing means powering the electric engine and arranged between the side wall and the leg area of the seat;
- a horizontal beam fixed to the seat and/or the electric energy storing means, the horizontal beam optionally being a longitudinal beam.

It is another aspect of the invention to provide an electric bus including:
- a side wall,
- a wheel;
- an electric engine coupled to the wheel in order to drive the electric bus;
- a seat with a seat base and a leg area which is below the seat base and vertically level with the wheel; and
- electric energy storing means powering the electric engine and arranged between the side wall and the leg area of the seat;
- a recess in which the electric energy storing means are disposed;
- a wheel housing in which the wheel is disposed, said wheel housing delimiting longitudinally the recess.

It is another aspect of the invention to provide an electric bus including:
- a side wall,
- a wheel with a rotation axis;
- an electric engine coupled to the wheel in order to drive the electric bus;
- a seat with a seat base and a leg area which is below the seat base and vertically level with the wheel;
- electric energy storing means powering the electric engine, and optionally arranged between the side wall and the leg area of the seat;
- the rotation axis is vertically level with the electric energy storing means, optionally in a boarding configuration and/or vertically distant from the electric energy storing means during a driving configuration which the wheel is disposed.

It is another object of the invention to provide an electric bus including:
- a wheel coupled to an electric engine,
- a low platform vertically level with the wheel, said low platform being notably adapted for standing passengers,
- a longitudinal row of seats
- electric energy storing means powering the electric engine, said electric energy storing means being disposed between the low platform and the longitudinal row of seats.

It is another object of the invention to provide an electric bus including:
- a wheel housing,
- a side wall delimiting the wheel housing,
- a low platform vertically level with the wheel housing,
- electric energy storing means disposed above the low platform,
- a longitudinal row of seats with at least one seat over the electric energy storing means,
- and/or a seat astride the wheel housing and the electric energy storing means.

It is another object of the invention to provide an electric bus including:
- a planar low platform notably adapted for standing passengers,
- a passenger compartment on the planar low platform,
- electric energy storing means arranged above the planar low platform,
- a longitudinal row of seats projecting along the whole length of the electric energy storing means, a wheel with a rotation axis vertically level with the passenger compartment and the electric energy storing means.

It is another object of the invention to provide an electric bus including:
- a low platform with a top surface,
- an electric engine,
- a wheel with and a rotation axis over the top surface, said wheel being notably coupled to the electric engine,
- a seat with a seat base which exhibits a lower surface vertically distant from the top surface, and
- electric energy storing means arranged vertically between the top surface of the low platform and the lower surface of the seat base, and/or, the rotation axis is disposed vertically between the lower surface of a seat and the top surface of the low platform.

It is another object of the invention to provide an electric bus including:
- a seat,
- a recess with electric energy storing means,
- a wheel housing with a wheel comprising an electric engine electrically connected to the electric energy storing means,
- an inclined bar below the seat and forming an interface between the wheel housing and the recess.

It is another object of the invention to provide a bus, such as an articulated bus, including:
- a wheel arrangement comprising at least: eight wheels or sixteen wheels;
- and at least: six or seven or height symmetry planes.

Preferably, the centres of the wheels of the wheel arrangement are disposed in accordance with the at least: six or seven or height symmetry planes.

Preferably, the at least: six or seven or height symmetry planes are vertical symmetry planes.

Preferably, the at least: six or seven or height symmetry planes comprise at least; six or seven transversal and vertical symmetry planes, and one longitudinal and vertical symmetry plane.

Preferably, the sixteen wheels are disposed in eight separate and distinct wheel housings.

Preferably, each wheel housing receives two wheels facing each other longitudinally.

Preferably, each wheel of the eight wheels or sixteen wheels is adapted from rotating independently form the other wheels.

Preferably, each wheel of the eight wheels or sixteen wheels is a steering wheel and/or a driving wheel, and/or associated with a respective damping system, and/or associated with a respective vertical actuator.

Preferably, the bus comprises electric energy storing means disposed in at least: four or eight or sixteen recesses which are arranged in accordance with three or four or seven symmetry planes of the at least: six or seven or height symmetry planes.

Preferably, the bus comprises a seat arrangement with seats which are arranged in accordance with three or four symmetry planes of the at least: six or seven or height symmetry planes, the seat notably forming longitudinal seat rows.

Preferably, the seats are above the wheels.

Preferably, the seats are above the wheel housings and/or the recesses, respectively the electric energy storing means.

Preferably, the recesses are longitudinally adjacent to the wheel housings.

Preferably the bus comprises at least two units, each unit receiving at least three symmetry planes of the wheel arrangement.

Preferably, said symmetry planes are considered in a top view of the bus.

Preferably, the symmetry planes are at distance from the wheels.

It is another object of the invention to provide a bus, such as an articulated bus, including:
- a wheel arrangement comprising at least: eight wheels or sixteen wheels;
- and a set of symmetry planes with:
  - a primary symmetry plane,
  - two secondary symmetry planes which are symmetric with respect to the primary symmetry plane,
  - four tertiary symmetry planes which are symmetric with respect to the primary symmetry plane,
  - and optionally a quaternary symmetry plan perpendicular to the primary, secondary and tertiary symmetry planes, tertiary symmetry planes exhibiting a symmetry with respect to at least one secondary symmetry plane.

It is another object of the invention to provide a bus, such as an articulated bus, including:
- a seat arrangement comprising at least: eight seats or sixteen seats;
- and at least: three or four symmetry planes.

It is another object of the invention to provide a bus, such as an articulated electric bus, including:
- recesses;
- electric energy storing means disposed in the recesses,
- said recesses being disposed in accordance with at least: three or four symmetry planes.

It may be understood that the symmetries are considered when the units of the articulated bus are aligned, namely when the inclination between the units is of 0°. Symmetry may allow slight variations of a few centimeters, for instance a variation of at most: 20 cm or 10 cm.

The different objects of the invention may be combined to each other. In addition, the preferable options of each object of the invention may be combined with the other objects of the invention, unless the contrary is explicitly mentioned.

Technical Advantages and Effects of the Invention

The present invention provides an electric bus architecture in which the electric energy storing means are involved in side collision safety. Indeed, the electric energy storing means form a safety block behind the side wall. There, their strength is used to protect the passengers, and notably their legs. More precisely, the legs and the backs of passengers sitting against the side wall are more protected. When the electric energy storing means are disposed at corners of the platform, they also provide protection against corner collisions, and substantially a protection against rear collisions from other vehicles.

The solid aspect of the electric energy storing means adds another barrier against physical intrusion. Moreover, the electric energy storing means are fixed to the structure of the electric bus.

Since they are fixed to the beam(s) to which the wheels are fixed, the electric energy storing means benefit from a robust anchorage.

In the context of a collision with a personal car, the front bumper is generally at the low platform level, and/or at the electric energy storing means level. Consequently, during a side collision the front bumper intrusion is blocked or reduced. In addition, the supporting structure and the brackets enabling the electric energy storing means fixation increase the collision energy absorption potential.

BRIEF DESCRIPTION OF THE DRAWINGS

Several embodiments of the present invention are illustrated by way of figures, which do not limit the scope of the invention, wherein FIG. 1 provides a schematic illustration of a side view of an electric bus in accordance with a preferred embodiment of the invention.

DETAILED DESCRIPTION OF THE INVENTION

This section describes the invention in further detail based on preferred embodiments and on the figures. Similar reference numbers will be used to describe similar or the same concepts throughout different embodiments of the invention.

It should be noted that features described for a specific embodiment described herein may be combined with the features of other embodiments unless the contrary is explicitly mentioned.

Features commonly known in the art will not be explicitly mentioned for the sake of focusing on the features that are specific to the invention. For example, the electric bus in accordance with the invention is evidently equipped with a computer, even though such computer is not explicitly referenced on the figures nor referenced in the description.

In the following description, the word "longitudinal" may correspond to the main elongation of the electric bus, and/or to the main driving direction of the electric bus. It may correspond to a central direction that projects along all the units of the electric bus. The transversal direction is perpendicular to the longitudinal direction of the electric bus. The word "inner" and "outer" are considered transversally. The word "outer" is directed toward the electric bus environment.

Figure 1:
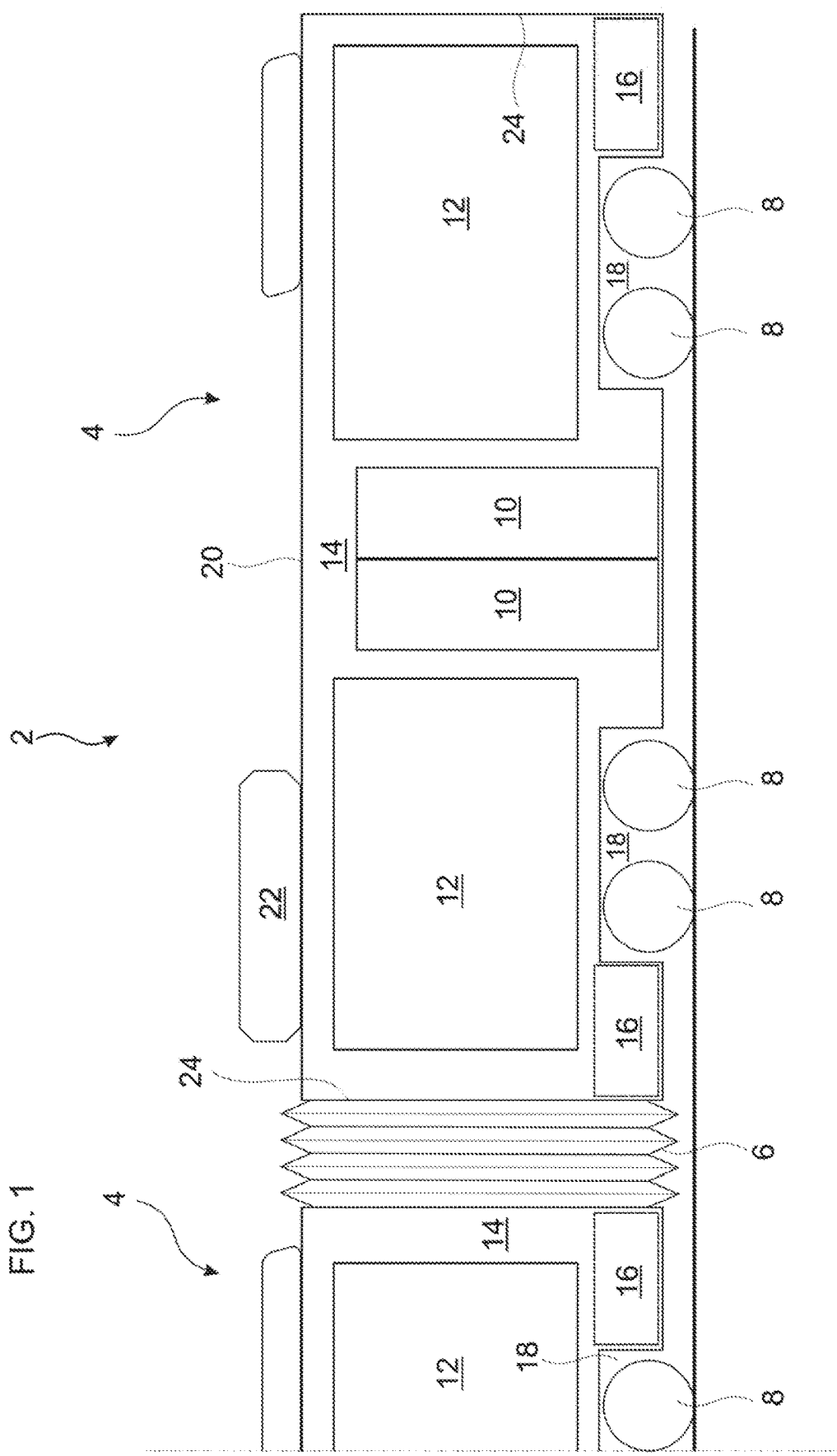

FIG. 1 shows a vehicle for mass transportation. The vehicle is adapted for transportation of passengers in cities and may transport about one hundred passengers, for instance one hundred and twenty passengers. The vehicle may be a bus, notably an electric bus 2. An electric bus 2 is understood as a bus using electric power for its driving engine(s), preferably exclusively electric energy. Hence, the electric bus 2 may be free of combustion engine.

The electric bus 2 may be an articulated bus. It may comprise a first unit 4 and a second unit 4 (partially represented). Each unit 4 may be a trailer and/or a tractor. Each unit 4 may be self-supporting. These units 4 may be joined by a connection, for instance a hinged connection 6 enabling the units 4 to swivel with respect to each other. In the current illustrative example, only two units 4 are represented, however it is contemplated in the current invention that the electric bus 2 includes three, four, or more units 4. An electric bus with a single unit is also foreseeable.

Each unit 4 includes one or several axles. Each axle includes wheels 8 engaging the ground. The wheels 8 may be driving wheels. At least one or each wheel 8 may be linked to the corresponding unit 4 by a suspension system (not represented in the current figure).

One or several or to each wheel 8 may be dotted with an electric engine (not represented in the current figure). These electric engines permit to rotate the wheels 8 on themselves in order to drive, to propel, the electric bus 2.

At least one or each unit 4 may include doors 10. The doors 10 may be arranged between side windows 12. The doors 10 provide an access to the passengers.

Each unit 4 may include side walls 14, notably two side walls 14 (only one per unit is apparent).

These side wall 14 may be transversally opposed. The side walls 14 may form the outer surface of the corresponding unit 4, and thus of the electric bus 2. The side walls 14 may receive the doors 10 and/or the side windows 12. One side wall may be free of door, and/or of side window. The side window(s) may be replaced by equipment. The side walls 14 may be part of the structure of the units 4.

The side walls 14 may receive flaps 16. The flaps 16 may be moved between an open and a closed position. The flaps 16 may open on electric energy storing means (not represented), for instance electric batteries. The electric energy storing means may be an electric energy storing module. The latter may be enclosed in recess (not represented) which are actually closed by the flaps 16. The electric energy storing means render the electric bus 2 electrically autonomous. Thus; the electric bus 2 may dispense from catenary and overhead lines.

The side walls 14 may delimit wheel housings 18. Each wheel housing 18 may receive at least one wheel 8, or at least two wheels 8 which are longitudinally offset, preferably longitudinally distant.

At least one or each wheel housing 18 may comprise a housing arch forming a part of the contour of the corresponding side wall 14.

The vehicle 2 exhibit a roof 20. The roof 20 may join two transversally opposite side walls 14. The roof 20 may receive equipment, for instance an air conditioning module 22, or other modules. The roof 20 may be free of energy storing means, preferably free of electric energy storing means.

Preferably, a majority the electric energy storing means are gathered in the lower half of the electric bus 2. Then, the centre of gravity is lowered, and the risk of tilting the electric bus in the event of a side collision are reduced. The electric bus 2, and notably the units 4, include longitudinal ends 24. The electric energy storing means may be arranged at the longitudinal ends 24.

The side walls 14 may define the passenger compartment between them. The passenger compartment is adapted for standing passenger, and for sitting passenger as well. For this purpose, the electric bus exhibits a seat arrangement within the passenger compartment.

Figure 2:
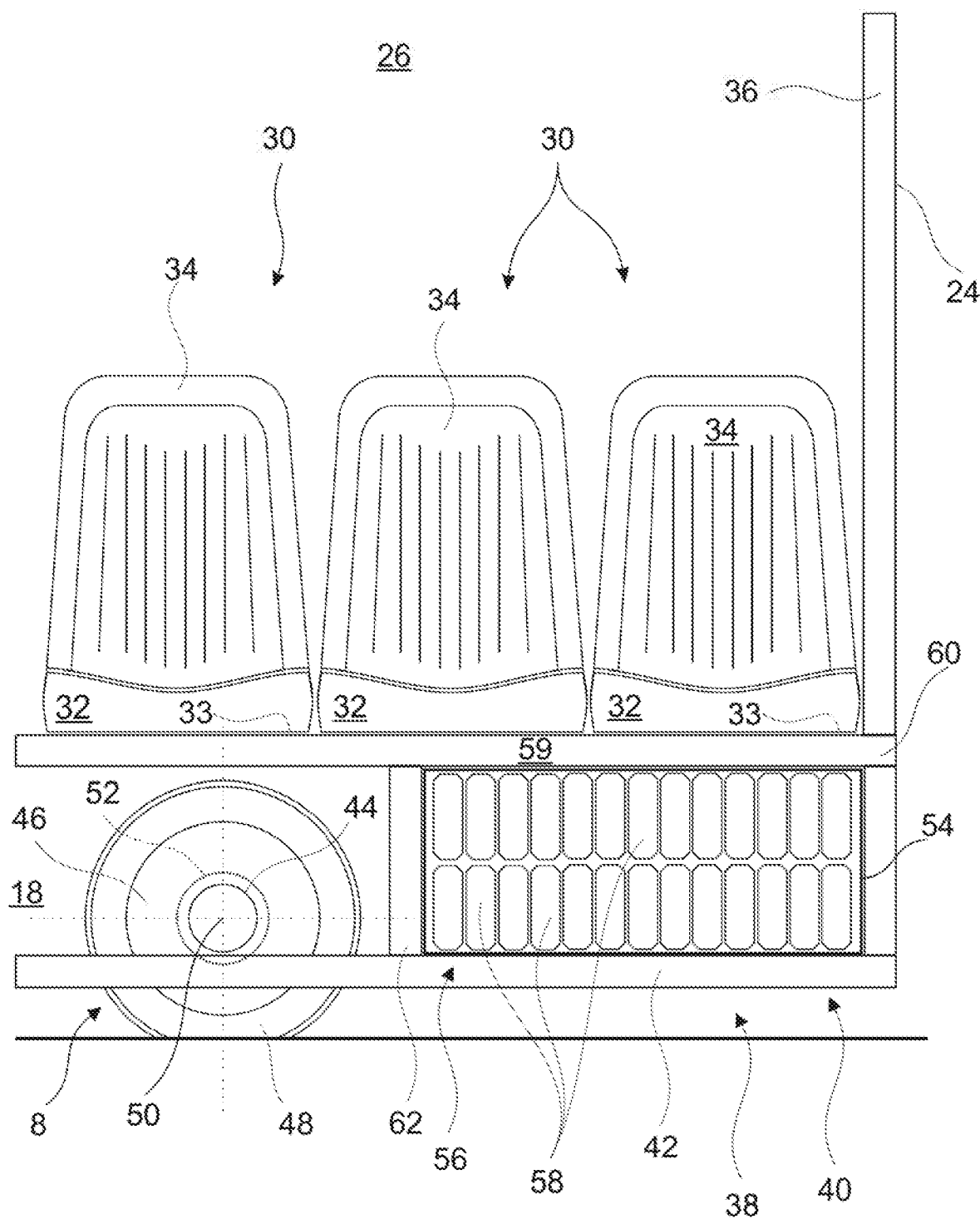
FIG. 2 provides a schematic illustration of a transversal view of an electric bus seat arrangement in accordance with a preferred embodiment of the invention.

FIG. 2 shows a passenger compartment 26 with a seat arrangement 28 of an electric bus, notably a portion of a unit. The unit as the electric bus may be identical or similar to the ones as described in relation with FIG. 1. FIG. 2 represents a sectional view of the passenger compartment 26 along a vertical and longitudinal plane.

The seat arrangement 28 may comprise at least one row of seats 30. The longitudinal row may be a longitudinal row in that the seats 30 are longitudinally in contact of each other, or longitudinally side by side. Longitudinally, the seats 30 may be regularly spaced from each other. The seats 30 may be identical and/or may form a longitudinal alignment. Each seat 30 may include a seat base 34 and notably a backrest 34 in elevation with respect to the corresponding seat base 32. The seat bases 34 may be horizontal.

The backrest 34 may face the longitudinal centreline of the bus, or of the unit respectively. Thus, the seats 30 may be transversal seats where passenger look in the transversal direction. Each seat 30 may present a lower surface 33, notably under the seat base 32.

In spite a single row is represented, two opposite seat rows may be considered. There, the backrests 34 may face each other transversally. In the represented longitudinal row, three seats 30 are apparent, however the invention contemplates other number of seats pro row. For instance, three seats 30 may be associated to each wheel 8, which means that the unit may comprise twenty-four seats, and the electric bus may include forty-eight seats 30. Then, each longitudinal row may include at least: six, or twelve, or twenty-four seats 30. The longitudinal row of seats 30 may extend up to a longitudinal end 24. The latter may be formed by a vertical post 36.

A low platform 40 may delimit the passenger compartment 26. The low platform 40 may be joined to the side walls. The low platform 40 may be flat, and/or planar. It may comprise a single planar top surface projecting along the majority of the length of the passenger compartment 26, or along the whole length. It may project from one longitudinal end 24 to a longitudinally opposite longitudinal end 24 of a unit.

The low platform 40 may comprise a low platform structure 38. The low platform structure 38 may be formed of beams, notably longitudinal beams and transversal beams which are interconnected.

The low platform structure 38 may form a grid, notably a single layer grid. The beams may be tubular beams, for instance of rectangular cross section. The beams may be joined by welding or gluing. Thus, the beams may form a one-piece element. The beams may be formed of aluminium, polymer composite materials enriched with carbon fibres are considered too in order to reduce the overall weight.

Beams may be understood as elongated and possibly straight elements. They may exhibit a profile, for instance a rectangular profile, a "U" profile, or any other suitable profile.

The low platform 40, and thus the low platform structure 38, may comprise a lower longitudinal beam 42. The lower longitudinal beam 42 may extend on the majority or the whole vertical thickness of the low platform 40. It may face the ground. It may project longitudinally along the majority of the unit.

The wheel 8 may be inflatable. Thus, it may flatten against the ground due to the weight of the electric bus. The wheel 8 may comprise a hub 44, a rim 46 and a tire 48. Its rotation axis 50 is represented. The rotation axis 50 may be arranged transversally.

The rotation axis 50 may be above the lower longitudinal beam 42. The wheel 8 is equipped with an electric engine 52 in order to propel the electric bus. It may be coaxially mounted to the wheel 8.

It may be disposed within the rim 46, and may engage the hub 44. Thus, the electric engine may share the rotation axis 50 of the wheel 8.

Electric energy storing means 54 may power the electric engine 52. The electric energy storing means 54 may be located in the recess 56. It may be an electric battery pack, for instance of LiMn2O4 with LiNiO2. It may include several modules 58. The modules 58 may define two longitudinal rows or alignments. Alternatively, the modules may form vertical stacks. The electric energy storing means 54, for instance in a battery pack contained in one recess 56 may count at least forty modules 54.

The electric energy storing means 54, and notably each module 58, may be disposed on the low platform 40, preferably above the lower longitudinal beam 42. The wheel 8 may be fixed to said lower longitudinal beam 42. The electric energy storing means 54 may be vertically thicker than the low platform 40, and/or may be placed thereon.

The electric energy storing means 54, and notably each module 58, may be disposed under the seats 30, preferably under the seat bases 32, and/or under the lower surface 33. In addition, the recess 56 may be disposed under the seats 30. Thus, the seats 30 may cover and/or hide the electric energy storing means 54. An upper longitudinal beam 60 may form the interface 59, such as a fixation interface or a connection interface, between the seats 30 and the electric energy storing means 54.

The interface 59 may form a separation. The upper longitudinal beam 60 may form a fixation support receiving the seat bases 32 and the modules 58. The longitudinal beam 60 may generally be a horizontal beam. The horizontal beam may form a vertical link between the seat(s) 30 and the storing means 54.

The upper longitudinal beam 60 may extend along the recess 56 and the wheel housing 18. A vertical bar 62 may form the interface between the recess 56 and the wheel housing 18. The vertical bar 62 may be beneath the seats 30, notably beneath the seat bases 32.

The recess 56 may be longitudinally longer than a seat, and/or may extend along at least two seats 30. The recess 56 may be defined by the upper longitudinal beam 60, the lower longitudinal beam 42, the vertical bar 62, the vertical post 36. These bar 62, post 36 and beams (60; 42) form and straighten the recess 56, and may form a protecting cage around the electric energy storing means 54.

Figure 3:
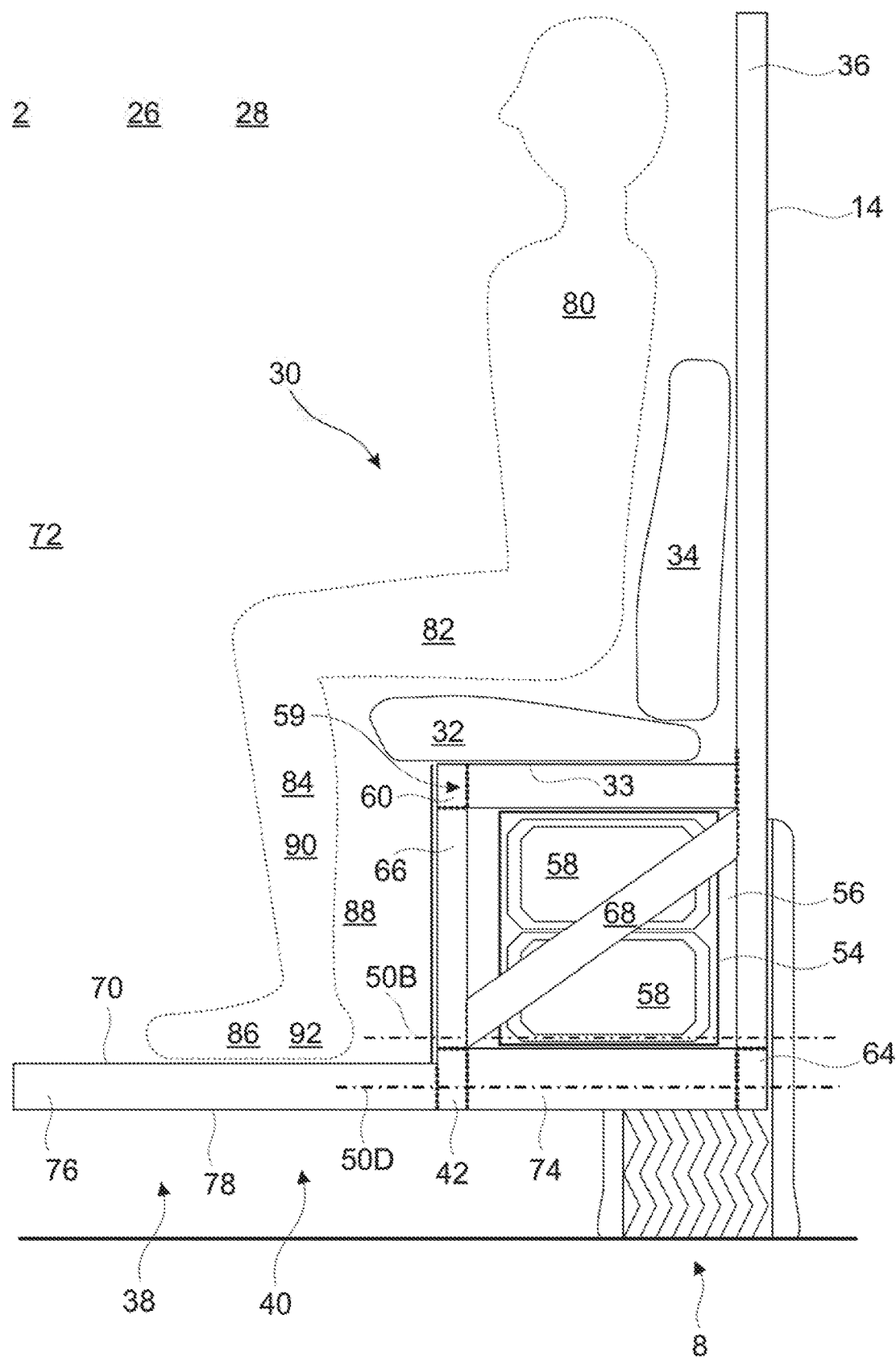
FIG. 3 provides a schematic illustration of a longitudinal view of an electric bus seat arrangement in accordance with a preferred embodiment of the invention.

FIG. 3 provides a schematic illustration of a seat arrangement 28. The seat arrangement 28 may be similar the to one as described in the preceding figure. The current illustration may be a longitudinal view of the seat arrangement 28.

Optionally, only a half of the seat arrangement 28 is represented, the other half may be deduced by a transversal symmetry. Thus, the electric bus may comprise several electric energy storing means 54 at each side, or at each side wall 14. The side wall 14 may be adjacent to the electric energy storing means 54, and may delimit transversally the recess 56.

As apparent in the current figure, the electric energy storing means 54 may from two stacked alignments of modules 58. The electric energy storing means 54 may be transversally and/or vertically level with the wheel 8.

The electric energy storing means 54 may be transversally and/or longitudinally level with the seat 30, notably the seat base 32. The seat 30 may project along the whole transversal width of the electric energy storing means 54, notably by means of the seat base 32 and of the backrest 34. The latter may be parallel to the side wall 14, and may be fixed thereon.

As it may be deduced from a combination of FIGS. 2 and 3, the recess 56 may exhibit a hexahedral shape. The upper longitudinal beam 60 may be separate and/or distant from the side wall 14. In addition, the lower longitudinal beam 42 as previously described may be a first lower longitudinal beam or an inner lower longitudinal beam. In addition, the low platform 40, and thus the low platform structure 38, may comprise an outer lower longitudinal beam 64. The former may form the side wall 14. These lower longitudinal beams (42; 64) may delimit the recess 56. A vertical plate 66 may close the recess 56, and isolate it from the passenger compartment 26. Other plates, such as a horizontal plate (not represented), or fitting may be added in order to delimit the passenger compartment 26 from the environment and/or from the recess 56. It may be understood that the horizontal plate is part of, or forms the seat, possibly the seat base.

The recess 56 may include an inclined bar 68. The inclined bar 68 may extend vertically and transversally. Its inclination with a horizontal plane may range between 30° and 60°, values included. The inclined bar 68 may face the electric energy storing means 54. It may project from the side wall 14, for instance from the vertical post 36, toward the lower longitudinal beam 42, notably the inner lower longitudinal beam. The inclined bar 68 may project down to the low platform 40, and may be in contact of the former. Thus, in the event of a side collision toward the electric energy storing means 54 the collision energy is transferred to the low platform 40 by the inclined bar 68. Another inclined bar may be provided at the interface between the recess 56 and the wheel housing.

The low platform 40 may comprise a top surface 70 which delimits the passenger compartment 26.

The top surface 70 may be a planar surface. It may be flat, which means without step, in order to keep rolling chair access. It may start at the doors, for instance through the longitudinal row of seats 30. The top surface 70 may project transversally on the majority of the electric bus 2, for instance from a seat 30 to the transversally opposite seat (not represented). The top surface 70 may form the floor of a longitudinal passage 72. The longitudinal passage 72 may extend along the whole unit, or the whole electric bus 2. The longitudinal passage 72 may join each seat 30 of the electric bus 2.

The low platform 40 may comprise beams of different thicknesses, notably different vertical thicknesses. For instance, an outer transversal beam 74 forming the recess 56 may be thicker than an inner transversal beam 76 under the longitudinal passage 72, preferably vertically thicker. The same may apply to longitudinal beams of the low platform 40. Thus, the recess 56 may form a side stringer of the electric bus 2.

The suspension system of the wheel 8 may include an actuator (not represented). The actuator permits to move vertically the wheel 8 with respect to the low platform 40. Consequently, the electric bus may be lifted, or tilted about a longitudinal axis. This permits to keep a ground clearance in a driving configuration, and to supress a vertical gap with a bus platform in a boarding configuration (currently represented). The respective positions of the wheel 8 are represented through its rotation axis 50B in a boarding configuration, and through a fictional rotation axis 50D in the driving configuration. These positions may be defined when the electric bus is on a planar ground. The ground clearance may be smaller than the radius of the wheels 8, and or represent at least 25% of the diameter of the wheels 8.

It may be noted that in the boarding configuration, the rotation axis 50B is above the low platform 40. It may be above the top surface 70. It may be vertically level with the electric energy storing means 54. Then, access to the passenger compartment remains easy. In the driving configuration, the rotation axis 50D may be vertically level the low platform 40, or more generally above the sub surface 78 of the low platform 40. Then, in the driving configuration the passenger compartment remains low, and the overall height of the electric bus 2 may be reduced.

A passenger 80 is represented seated on the seat 30. The passenger 80 comprises legs with femurs 82 on the seat base 32, tibias 84, and feet 86 on the low platform 40. It is defined that the seat 30 includes a leg area 88. The leg area 88 may comprise a tibia area 90 and a foot area 92 receiving respectively the tibias 84 and the feet 86 of the passenger 80. The leg area 88 may be vertically between the low platform 40 and the seat base 32. More generally, the leg area 88 is not limited to real or theorical legs. It may be vertically between the lower surface 33 and the top surface 70.

In the boarding configuration, and possibly in the driving configuration, the rotation axes (50B; 50D) may be vertically level with the leg area 88, for instance vertically level with the tibia area 90 and/or the foot area 92. These areas (88-92) may be vertically level with the electric energy storing means 54. Therefore, in the event of a side collision, the legs of the passenger 80 are protected by the electric energy storing means 54. More specifically, the tibias 84 are hidden by the electric energy storing means 54 with regard to a side collision. By the way, the passenger whole body may benefit from this safety. Injuries to passenger backs are also limited by the blocking effect provided by the electric energy storing means 54.

The upper beam 60 may form the fixation interface 59 for the seat 30 and/or the storing means 54.

The fixation interface 59 may be horizontal. The fixation interface 59, and notably its horizontal beam(s), may form a separation, notably in combination with the horizontal plate. The upper beam 60 may be transversally between the storing means 54 and the leg area 88. There, it improves safety. It may form the interface between the storing means 54 and: the storing means 54 and/or the longitudinal passage 72.

Figure 4:
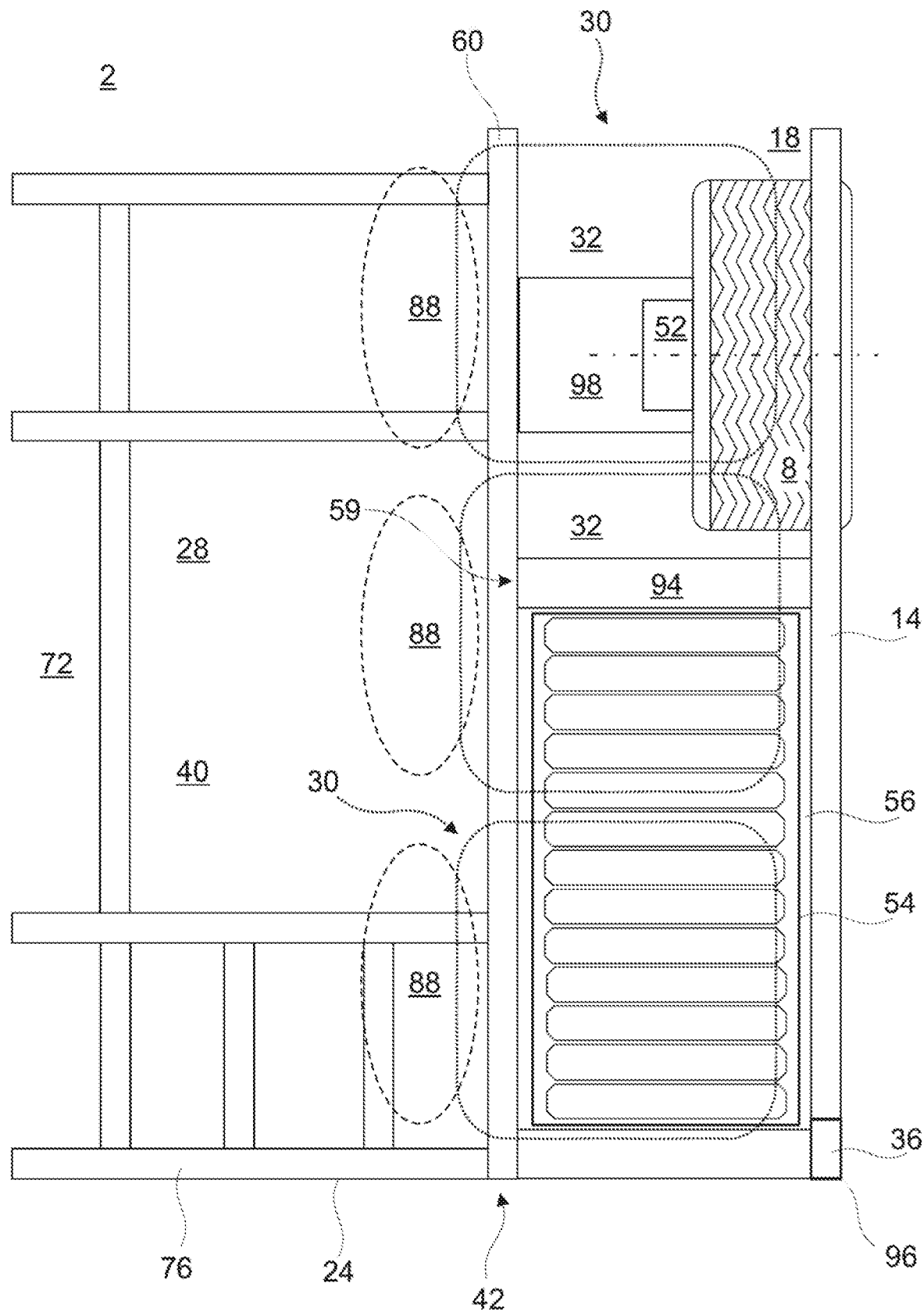
FIG. 4 provides a schematic illustration of an aerial view of an electric bus seat arrangement in accordance with a preferred embodiment of the invention.

FIG. 4 provides a schematic illustration of a seat arrangement 28. The seat arrangement 28 may be similar to the ones as described in the preceding figures. The current illustration is a top view of the seat arrangement 28. The side wall 14, the longitudinal end 24, the upper longitudinal beam 60, the longitudinal passage 72 and the inner transversal beam 76 are referenced.

The wheel 8 with its electric engine 52 are represented at distance from the electric energy storing means 54, and from the corresponding recess 56. A transversal bar 94 may be part of the interface between the wheel housing 18 and the recess 56. The transversal bar 94 projects from the side wall 14 to the upper longitudinal beam 60 in order to provide side collision strength. The transversal bar 94 and the upper longitudinal beam 60 are horizontal beams, or more generally substantially horizontal beams. They may form, at least partially the fixation interface 59 between the seat 30 and the storing means 54.

The vertical post 36 may form a corner 96 of the electric bus 2. The electric energy storing means 54 may be disposed at this corner 96 in order to provide corner protection. The low platform 40, and notably the floor formed thereon, may exhibit a rectangular shape. Optionally, the electric bus includes electric energy storing means 54 at each corner 96.

The leg areas 88 of the seats 30 may be within the longitudinal passage 72, and inward with respect to the seat bases 32 (in doted lines). The seat bases 32 may cover their respective leg areas 88. The leg areas 88 may be separated from the side wall 14 by the recess 56 and the electric energy storing means 54, notably by the upper longitudinal beam 60. The leg areas 88 may be longitudinally distant from one another. Each of them may be associated to a single seat 30.

The suspension system 98 of the wheel 8 is longitudinally distant from the electric energy storing means 54. It may be transversally level with the electric energy storing means 54. It may be vertically level with the electric energy storing means 54, for instance in the boarding and/or in the driving configuration.

Since the wheel may be fixed to the beams (42; 60), the latter have to be reinforced in order to support the electric bus 2. Since these beams (42; 60) receive the electric energy storing means 54 and/or form the recess 56, the combination of the electric energy storing means 54 and the beams is even more robust.

The fixation interface 59 may be part of the wheel housing 18. The upper beam 60, or more generally the horizontal beam(s), may form the wheel housing and may form its structure.

Figure 5:
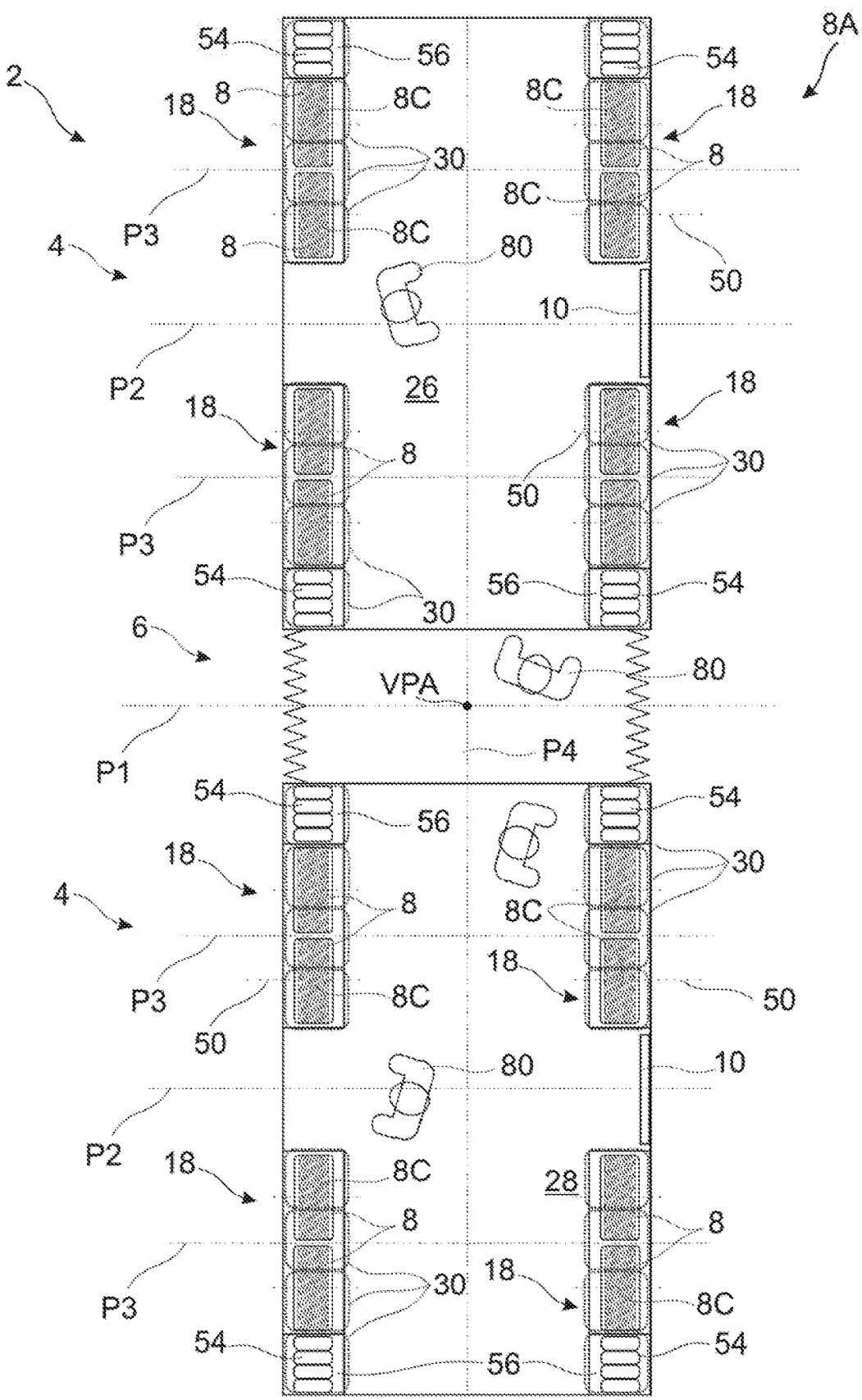
FIG. 5 provides a schematic illustration of an aerial view of an electric bus exhibiting symmetry in accordance with a preferred embodiment of the invention.

FIG. 5 provides a schematic illustration of a bus 2, such as an electric bus 2. The current illustration is a top view of the bus 2. For the sake of representation, several passengers 80 are standing in the passenger compartment 26. The bus 2 may be similar or identical to those as described in relation with any one of FIGS. 1 to 4.

The bus may be an articulated bus 2 with at least two units 4 joined by a hinged connection 6 allowing pivot motions about a vertical pivot axis VPA. In the current illustration, the units 4 are aligned, and the bus is driving along a straight line, for instance along the longitudinal central axis LCA of the bus 2. In such a configuration, the units 4 are aligned, and have a common longitudinal central axis LCA.

As an option, the bus 2 comprises height wheel housings 18. Each unit 4 may comprise four wheel housings 18. The bus 2 comprises sixteen wheels 8. Each unit 8 is equipped with eight wheels 8.

Each wheel housing 18 may receive two wheels 8. In each wheel housing 18, the wheels 8 may be transversally aligned, and/or longitudinally one after the other. The wheels 8 may be driving wheels 8, with in wheel engines (not represented).

The seat arrangement 28 may be similar to the ones as described in the preceding figures. The recesses 56 and the electric energy storing means 54 may be similar to the ones as described in the preceding figures.

The wheels 8 may be disposed in accordance with a wheel arrangement 8A. The wheel arrangement 8A may exhibit several symmetry planes distributed along the bus.

The bus 2, and notably the wheel arrangement 8A, comprises a primary symmetry plane P1, or first symmetry plane P1. The primary plane of symmetry P1 is vertical and transversal. It may be a bus symmetry plane. It may be perpendicular to the longitudinal central axis LCA. It may cross the hinged connection 6. The units 4 may be symmetric with respect to the primary symmetry plane P1, the doors 10 as well. The seats 30 may be disposed in a symmetric pattern with respect to the primary symmetry plane P1. The electric energy storing means 54 may be arranged in a symmetric configuration with respect to the primary symmetry plane P1. The recesses 56 may be arranged in a symmetric configuration with respect to the primary symmetry plane P1. The wheel housings 18 of the bus 2 may show a symmetric arrangement with respect to the primary symmetry plane P1.

The primary symmetry plane P1 may be along the vertical pivot axis VPA. The wheels 8 may be disposed with symmetric positions with respect to the primary symmetry plane P1. Thus, each wheel 8 finds a symmetric wheel with respect to the primary symmetry plane P1.

The bus 2 further comprises two secondary symmetry planes P2, or seconds symmetry planes P2.

The secondary symmetry planes P2 may be symmetric with respect to the primary symmetry plane P1. In at least one or in each unit 4, the wheels 8 are disposed in a symmetric arrangement with respect to the associated secondary symmetry plane P2. The secondary symmetry planes P2 may be unit symmetry planes.

Within each unit 4, the wheel housings 8 may be disposed in a symmetric arrangement with respect to the corresponding secondary symmetry plane P2. Within each unit 4, the recesses 56 receiving the electric energy storing means 54 may be disposed in a symmetric arrangement with respect to the associated secondary symmetry plane P2. Within each unit 4, the seats 30 may be disposed in a symmetric arrangement with respect to the corresponding secondary symmetry plane P2.

The bus 2, notably the wheel arrangement 8A, further comprises four tertiary symmetry planes P3, also designated as third symmetry planes P3. The four tertiary symmetry planes P3 may be symmetric with respect to the primary symmetry plane P1. Within each unit 4, the tertiary symmetry planes P3 may be symmetric with respect to the associated secondary symmetry plane P2. The tertiary symmetry planes P3 may be across the wheel housings 18. They may be wheel housing symmetry planes P3. The wheels 8 in the wheel housings 18 are symmetric with respect to the tertiary symmetry planes P3. Each of the tertiary symmetry plane P3 may defined a symmetry for two wheel housings 18. Each wheel 8 in one of the wheel housings 18 is associated with a symmetric wheel with respect to the associated tertiary symmetry plane P3. The secondary symmetry planes P2 may be closer to the tertiary symmetry planes P3 than to the primary symmetry plane P1.

As an option, recesses may be disposed in a symmetric configuration with respect to at least one or the tertiary symmetry planes.

The primary, secondary and tertiary symmetry planes (P1; P2; P3) may be parallel to each other.

They may be perpendicular to the longitudinal central axis LCA. They may extend longitudinally and transversally. They may each be at distance from the wheels 8, and/or the recesses 56.

The bus 2 further comprises a quaternary symmetry plane P4. The quaternary symmetry plane P4 may be along the longitudinal central axis LCA. It may be perpendicular to the primary, secondary and tertiary symmetry planes (P1; P2; P3). Within the wheel arrangement 8A, each wheel 8 is associated with a symmetric wheel with respect to the quaternary symmetry plane P4.

The primary to quaternary symmetry planes (P1; P2; P3; P4) apply to the wheel arrangement 8A, and define symmetries between the different wheels 8; namely the at least eight or sixteen wheels 8. The symmetry planes (P1; P2; P3; P4) are between the wheels 8, and preferably at distance from the threads of the wheels 8. The symmetry planes (P1; P2; P3; P4) may apply to the positions of the centers 8C of the wheels 8. These centres 8C may be on the rotation axes 50, transversally in the middles of the wheels 8.

The wheels 8, the recesses 56 with batteries, and the seats 30 forms blocks. These blocks are disposed in a symmetric arrangement defined by the primary, secondary and quaternary symmetry planes (P1; P2; P4).

The current arrangement provides a compromise between the load distribution, manocuvrability, and compactness. Thus, the current arrangement may be designated as a "drakkar" arrangement.

Arranging the wheels by pairs in the wheel housing strengthen the bus structure and fosters manoeuvrability. The recesses which are adjacent to the wheel housing also improves compactness and the strength of the bus structure. In addition, arranging the seats above the wheels, notably the wheel housings, and the recesses further develop the compactness, and maintain a comfortable roomy passenger compartment. The eight blocks which are therefore created.

The embodiments of FIGS. 2 to 4 may be isolated from one another. It is also considered to combine the teachings of FIGS. 2 to 4, and optionally with the teachings of FIGS. 1 and/or 5.

In FIGS. 2 to 4, only a portion of electric bus is represented. The whole bus may be obtained by one or two symmetries.

It should be understood that the detailed description of specific preferred embodiments is given by way of illustration only, since various changes and modifications within the scope of the invention will be apparent to the person skilled in the art. The scope of protection is defined by the following set of claims.

The invention claimed is:

1. An electric bus, comprising:
   a side wall that forms an outer surface of the electric bus;
   a top surface that forms a floor of the electric bus;
   a wheel;
   an electric engine coupled to the wheel in order to drive the electric bus;
   a seat with a seat base and a leg area, wherein the leg area is below the seat base and vertically level with the wheel;
   an electric energy storing device powering the electric engine and arranged between the side wall and the leg area of the seat;
   a fixation interface that includes a horizontal beam, wherein the seat and the electric energy storing device are fixed to the fixation interface, and wherein the horizontal beam is vertically disposed between the electric energy storing device and the seat;
   a vertical plate spaced laterally inward from the side wall, the vertical plate connecting the top surface and the horizontal beam together; and
   an inclined bar extending in an inclined manner from the vertical plate to the side wall so as to connect the side wall and the vertical plate together.

2. The electric bus according to claim 1, further comprising a low platform with the top surface and a passenger compartment with a longitudinal passageway, wherein the wheel defines a rotation axis.

3. The electric bus according to claim 2, wherein the wheel is vertically mobile between at least a driving position in which the rotation axis of the wheel is below the top surface, and a boarding position in which the rotation axis of the wheel is above the top surface of the low platform.

4. The electric bus according to claim 2, wherein the wheel includes a hub and a rim around the hub, the top surface being vertically level with the hub and with the rim, and the electric engine is disposed in the rim and attached to the hub.

5. The electric bus according to claim 2, wherein the top surface extends longitudinally along at least a longitudinal half of a longitudinal length of the side wall.

6. The electric bus according to claim 2, wherein the rotation axis is vertically level with the electric energy storing device in a boarding configuration, and vertically distant from the electric energy storing device during a driving configuration.

7. The electric bus according to claim 2, wherein the low platform includes at least one lower longitudinal beam below the electric energy storing device, said lower longitudinal beam being an inner lower longitudinal beam, and the low platform further includes an outer lower longitudinal beam which partially forms the side wall.

8. The electric bus according to claim 2, wherein the low platform includes a low platform structure under the electric energy storing device and vertically level with the wheel.

9. The electric bus according to claim 1, wherein the seat base transversally projects over a majority of a width of the electric energy storing device, and over a whole transversal width of the wheel.

10. The electric bus according to claim 1, further comprising at least one longitudinal upper beam to which the electric energy storing device and the seat base are fixed, and a longitudinal row of seats partially formed by said seat, the longitudinal row being fixed to the longitudinal upper beam.

11. The electric bus according to 10, wherein the at least one longitudinal upper beam vertically separates the electric energy storing device from the seat and transversally separates the electric energy storing device from the leg area.

12. The electric bus according to claim 1, wherein the seat includes a transversally inner half and a transversally outer half, the horizontal beam being an inboard beam fixed at the transversally inner half of the seat.

13. The electric bus according to claim 1, further comprising a rectangular floor with a first corner and a second corner, wherein the electric energy storing device is a first electric energy storing device disposed at the first corner of the rectangular floor, and wherein the electric bus further includes a second electric energy storing device disposed at the second corner of the rectangular floor.

14. The electric bus according to claim 1, wherein the electric energy storing device is a first electric energy storing device adjacent to the side wall, and the electric bus includes a second electric energy storing device adjacent to said side wall, the wheel being disposed between the first electric energy storing device and the second electric energy storing device.

15. An electric bus, comprising;
   a side wall that forms an outer surface of the electric bus;
   a top surface that forms a floor of the electric bus;
   a wheel;
   a recess;
   an electric engine coupled to the wheel in order to drive the electric bus;
   a seat with a leg area and a seat base, the seat base being above the leg area and the wheel;
   an electric energy storing device powering the electric engine and arranged in the recess, between the side wall and the leg area of the seat;
   a fixation interface that includes a horizontal beam to which the seat and the electric energy storing device are fixed, said fixation interface longitudinally extending along the recess and the seat;
   a vertical plate spaced laterally inward from the side wall, the vertical plate connecting the top surface and the horizontal beam together; and
   an inclined bar extending in an inclined manner from the vertical plate to the side wall so as to connect the side wall and the vertical plate together.

16. The electric bus according to claim 15, wherein the side wall includes a flap delimiting the recess, the electric energy storing device being transversally disposed between the flap and the leg area.

* * * * *